Figure 1:
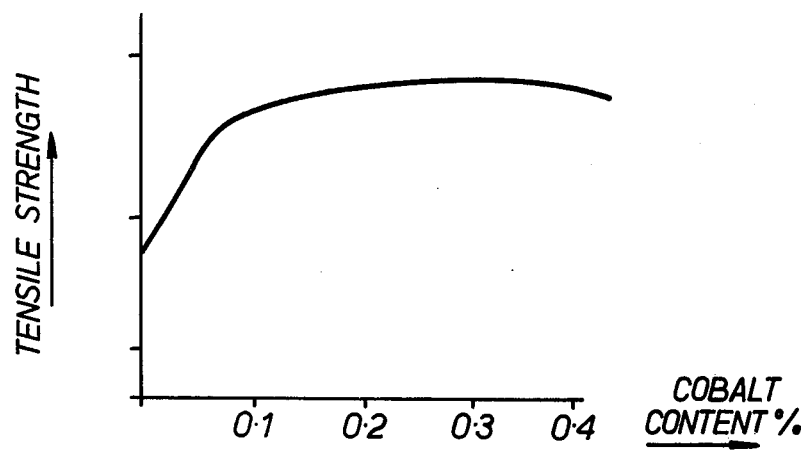

United States Patent [19]
Goddard et al.

[11] 4,140,835
[45] Feb. 20, 1979

[54] BEARING MATERIALS

[75] Inventors: David J. Goddard, Greenford, England; Sanae Mori, Nagoya, Japan

[73] Assignees: The Glacier Metal Company Limited, Middlesex, England; Daido Metal Company Limited, Nagoya, Japan

[21] Appl. No.: 808,660

[22] Filed: Jun. 21, 1977

[51] Int. Cl.² .................. C22C 13/00; B32B 15/18
[52] U.S. Cl. .......................... 428/648; 75/175 A
[58] Field of Search .................. 75/175 A; 428/648

[56] References Cited
U.S. PATENT DOCUMENTS 3,563,732  2/1971  Morisaki .................. 75/175 A Primary Examiner—M. J. Andrews
Attorney, Agent, or Firm—Oblon, Fisher, Spivak, McClelland & Maier

[57] ABSTRACT

This invention is an alloy for use as a bearing lining as an alternative to the known "white metals".

The alloy is predominantly of tin, but includes from 0.001 to 0.5% by weight of chromium and from 0.005 to 0.5% by weight of cobalt.

The micro-structure is good and the alloy can be bonded to a steel backing, and is strong and ductile.

7 Claims, 2 Drawing Figures

BEARING MATERIALS

This invention relates to alloys for use as bearing materials of the general kind known as "white metals" which can be defined as alloys of which a prodominant component is tin, or lead, or cadmium.

An object of the invention is to provide such an alloy which is capable of being effectively bonded to a steel or other bearing backing material, and which has good tensile strength and ductility, impact resistance and fatigue strength.

According to the present invention, an alloy comprises from 0 to 1.5% by weight of cadmium, from a trace to 9% by weight of copper, from a trace to 13% by weight of antimony, from 0 to 2% by weight of manganese, from 0 to 2 by weight of nickel, from 0.001% to 0.5% by weight of chromium, from 0.005% to 0.5% by weight of cobalt, the balance being tin.

It will be noted that the alloy does not include beryllium, but does include cobalt as an essential component together with chromium.

It has been discovered that white metals which include chromium can have their micro-structure and their bearing properties very much improved by the inclusion of the cobalt, and this improvement can be achieved even where the alloy solidifies from the molten stage slowly as is common in the manufacture of bearings with a massive steel backing, and it is therefore a great advantage of the alloy that even with slow solidification satisfactory bearing properties can be achieved.

One result of slow cooling is that the copper/tin needle length in an alloy including copper, tends to increase substantially if cooling has been slow, but if the cobalt is present in accordance with the present invention, it has been found by experimentation under controlled laboratory conditions that the increase in needle length is not very much greater if the cooling is slow.

A preferred percentage by weight of cobalt is about 0.3% to achieve this effect on the needle length.

However an addition of only 0.05% of cobalt to the composition of a white metal can raise the tensile strength of the chill cast alloy by approximately 5% without affecting the ductility which remains substantially constant at over 20%. With slow cooling the tensile strength of the alloy can be increased by about 20% as compared with an alloy not including the cobalt. After slow cooling the tensile strength can be increased by about 20%.

The following table shows the tensile strength, percentage elongation, and hardness for eight alloys formed by slow cooling, not including cobalt together with chromium and a ninth alloy in accordance with the invention, and demonstrates the improvement in the bearing properties.

| ALLOYS | Component percentage by weight | | | | | Properties. | | |
|---|---|---|---|---|---|---|---|---|
| | Copper | Antimony | Cadmium | Tin | Others | Tensile Strength MN/m² | % Elongation | Hardness value |
| Conventional Alloys | 2.93 | 7.45 | — | BALANCE | — | 53.0 | 6.0 | 23 |
| | 4.1 | 9.15 | — | " | — | 64.0 | 3.0 | 28 |
| | 3.64 | 8.61 | 0.94 | " | — | 68.0 | 5.0 | 30.4 |
| | 3.64 | 8.76 | 0.91 | " | .31Co | 71.0 | 7.0 | 31.7 |
| | 3.90 | 8.92 | 0.94 | " | .27Mn | 67.0 | 6.0 | 26.8 |
| | 3.12 | 7.83 | 1.15 | " | .34Ni | 70.0 | 6.0 | 30.6 |
| | 3.70 | 8.54 | 0.90 | " | .14Cr | 72.0 | 7.0 | 31.1 |
| | 3.66 | 8.43 | 0.90 | " | .15 Cr, Be | 74.0 | 8.0 | 31.2 |
| According to the Invention. | 3.71 | 8.64 | 0.91 | BALANCE | .23Co, .11 Cr | 87.0 | 12.0 | 33.7 |

Then FIG. 1 shows for a particular alloy, the improvement in the tensile strength obtainable with increasing proportions of cobalt, and it will be seen that after about 0.1 or 0.15% of cobalt there is little further improvement in the tensile strength.

Figure 2:
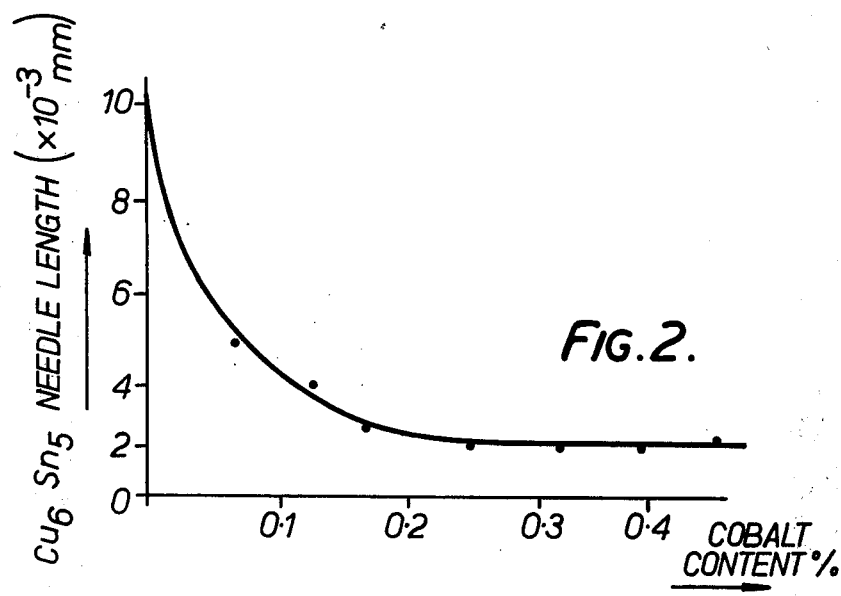

FIG. 2 shows how the copper/tin (Cu6, Cu3) needle length reduces with increasing amounts of cobalt, and that little further reduction is achieved after 0.2% of cobalt is included. The particular alloy composition in each case of 3.46–3.72% copper, 8.32–8.64% antimony, 0.79–0.91% cadmium, 0.094–0.10% chromium with various amounts of cobalt, the balance being tin.

The general effect is the same whatever the amount of chromium within the range 0.005% to 0.5%.

As a general statement it can be said that the best mechanical properties are obtained at about 0.1% cobalt, while the finest micro-structure is obtained at about 0.3% cobalt.

A further benefit obtained from the use of chromium and cobalt in conjunction is that the alloy micro-structure becomes very much less sensitive to the effects of the presence of arsenic which tends to coarsen the copper tin precipitate when only chromium (or chromium and beryllium) is present.

The following are examples of "white metal" alloys embodying the invention:

EXAMPLE I

Copper 3.10% by weight
Antimony 8.92% by weight
Cadmium 0.96% by weight
Chromium 0.11% by weight
Cobalt 0.19% by weight
Tin Balance

EXAMPLE II

Copper 2.75% by weight
Antimony 7.34% by weight
Cadmium 1.40% by weight
Chromium 0.16% by weight
Cobalt 0.29% by weight
Tin Balance.

EXAMPLE III

Copper 4.73% by weight
Antimony 8.64% by weight

Cadmium 0.67% by weight
Chromium 0.05% by weight
Cobalt 0.41% by weight
Tin Balance

EXAMPLE IV

Copper 3.50% by weight
Antimony 8.76% by weight
Cadmium 0.83% by weight
Chromium 0.09% by weight
Cobalt 0.23% by weight
Nickel 0.26% by weight
Tin Balance.

EXAMPLE V

Copper 3.41% by weight
Antimony 8.24% by weight
Cadmium 0.96% by weight
Chromium 0.08% by weight
Cobalt 0.15% by weight
Nickel 0.12% by weight
Tin Balance.

The preferred ranges of the various components within which exceptional results are obtained are as follows:

Copper 2.0 to 5.0% by weight
Cadmium 0.5 to 1.5%
Antimony 6.0 to 10.0%
Manganese 0 to 0.1%
Nickel 0 to 0.3%
Chromium 0.01 to 0.3%
Cobalt 0.05 to 0.3%

We claim:

1. An alloy comprising from 0 to 1.5% by weight of cadmium, from a 0.5% to 9% by weight of copper, from 0.5% to 13% by weight of antimony, from 0 to 2% by weight of manganese, from 0 to 2% by weight of nickel, from 0.001% to 0.5% by weight of chromium, from 0.005% to 0.5% by weight of cobalt, the balance being tin.

2. An alloy as claimed in claim 1 in which there is more than 1% of copper.

3. An alloy as claimed in claim 1 in which there is more than 5% of antimony.

4. An alloy as claimed in claim 1 in which there is more than 0.1% of cadmium.

5. An alloy as claimed in claim 1 in which there is about 0.1% of cobalt.

6. An alloy as claimed in claim 1 in which there is about 0.3% of cobalt.

7. A bearing comprising a backing having a lining of an alloy as claimed in claim 1.

* * * * *

UNITED STATES PATENT AND TRADEMARK OFFICE
CERTIFICATE OF CORRECTION

PATENT NO. : 4,140,835
DATED : February 20, 1979
INVENTOR(S) : Goddard et al

It is certified that error appears in the above-identified patent and that said Letters Patent are hereby corrected as shown below:

Please insert the following Priority Data to read as follows:

--[30]   June 23, 1976 Great Britain...26010

October 26, 1976 Great Britain...26010   --

Signed and Sealed this

Twenty-fifth Day of September 1979

[SEAL]

Attest:

LUTRELLE F. PARKER
Attesting Officer   Acting Commissioner of Patents and Trademarks